United States Patent [19]

Selman

[11] 3,834,628
[45] Sept. 10, 1974

[54] TRICKLE IRRIGATION DEVICE
[76] Inventor: Herzl Selman, Ramot Hashavim, Israel
[22] Filed: Mar. 20, 1973
[21] Appl. No.: 342,964

[30] Foreign Application Priority Data
Apr. 25, 1972 Switzerland.................. 6140/72
Jan. 29, 1973 South Africa................ 73/0636

[52] U.S. Cl................. 239/542, 47/48.5, 239/272, 239/553.5
[51] Int. Cl............................................. B05b 1/30
[58] Field of Search ............ 239/542, 553, 86, 488, 239/547, 450, 145, 271, 272, 553.5; 138/42, 43; 47/1.2, 48.5

[56] References Cited
UNITED STATES PATENTS
2,709,623  5/1955  Glynn ................................ 239/488
2,752,201  6/1956  Blass ................................. 239/488
3,667,685  6/1972  Rinkewich ................... 239/553.5 X
3,729,142  4/1973  Rangel-Garza et al. ............ 239/542

*Primary Examiner*—Lloyd L. King
*Assistant Examiner*—Andres Kashnikow
*Attorney, Agent, or Firm*—Benjamin J. Barish

[57] ABSTRACT

Trickle irrigation devices are described comprising an outer housing and an inner core. The contacting surfaces of the housing and core define a chamber and a plurality of separate parallel labyrinths each communicating with the chamber. The core is fixed within the housing by means of threads which define a spirally-extending conduit providing a path, between the water inlet and the chamber to the labyrinths. In one described embodiment, the core is a unitary member formed with both the threads and the labyrinth configuration; and in a second described embodiment the core comprises two sections, one being formed with the threads, and the other being a replaceable annular insert formed with the labyrinth configuration.

10 Claims, 6 Drawing Figures

PATENTED SEP 10 1974 3,834,628

TRICKLE IRRIGATION DEVICE

BACKGROUND OF THE INVENTION

The present invention relates to trickle irrigation devices, such as are used in argiculture and horticulture irrigation.

Irrigation in agriculture and horticulture is being increasingly effected by means of trickle devices which supply the water directly to the plants at a drip or trickle rate. By this means, the water can be supplied where, when, and to the extent needed. Drip or trickle irrigation has been shown to produce not only water savings, but also increased productivity.

The known trickle irrigation devices usually include a labyrinth through which the water flows, which labyrinth subjects the water to a long and continuously changing path to produce a large pressure drop before it exits. In the known trickle devices of this type, the labyrinth is generally formed by a narrow groove. Such devices, however, are easily clogged by foreign bodies, such as grains of sand and other impurities carried by the water. Also, in many cases it is quite difficult to clean them. In addition, these trickle devices are used in large quantities, and therefore an installation involves a large expense, particularly if the unit costs are substantial.

Further, it is frequently necessary to change the rate of water discharge to meet different conditions. This is usually done by designing the trickle devices according to different discharge rates and using the appropriate one for the trickle-rate desired. Thus, a large inventory may be required to enable change and flexibility in the discharge rates, both during the initial installation and later during use to meet changing conditions.

SUMMARY OF THE PRESENT INVENTION

An object of the present invention is to provide new trickle irrigation devices having advantages in the above respects.

More particularly, one object of the invention is to provide a single trickle irrigation device which in effect serves the purposes of a number of such devices, thereby substantially reducing the unit costs for each device. A further object is to provide a trickle irrigation device in which the discharge rate may be easily changed by merely substituting a relatively small insert, rather than replacing the whole unit.

According to one aspect of the invention, the trickle irrigation device comprises a housing having a water supply inlet connectable to a water supply pipe, and an inner core disposed within the housing in contact with its inner surface. The contacting surfaces of the housing and core define a chamber communicating with the water supply inlet, and further define a plurality of labyrinths having their inlets in communication with the chamber. The device further includes separate labyrinth outlets each communicating with the outlet end of its respective labyrinth.

One such device is thus equivalent to a plurality of trickle nozzles.

According to another aspect of the invention, one end of the housing is formed with internal threads and one end of the core is formed with external threads dimensioned with respect to the internal threads of the housing to define between them a spirally-extending conduit communicating with the housing inlet. The opposite end of the core is formed with a surface configuration which, together with the contacting inner surface of the housing, defines a labyrinth communicating at one end with the spirally-extending conduit.

According to a further aspect of the invention, the trickle irrigation device comprises an annular insert removably carried within the housing, the insert being formed with external ribs defining, with a contacting surface of the housing, the labyrinth communicating with the inlet. The insert thus determines the discharge rate, and to change the discharge rate, it is only necessary to replace the insert with one formed with ribs providing the desired rate.

BRIEF DESCRIPTION OF THE DRAWINGS

The invention is herein described, by way of example only, with respect to the accompanying drawings, wherein.

DESCRIPTION OF THE PREFERRED EMBODIMENTS

Figure 1:
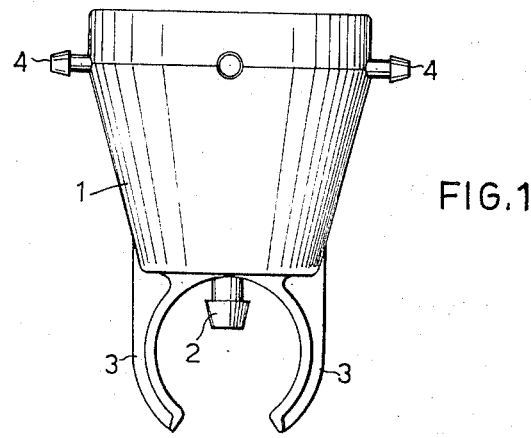
FIG. 1 is a side elevational view of one form of trickle irrigation device constructed in accordance with the invention.
Figure 2:
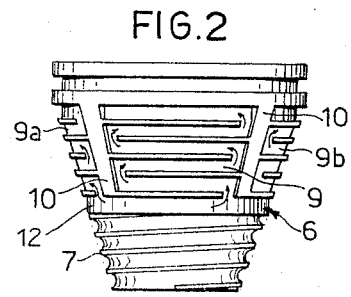
FIG. 2 is a side elevational view of the core included in the device of FIG. 1.
Figure 3:
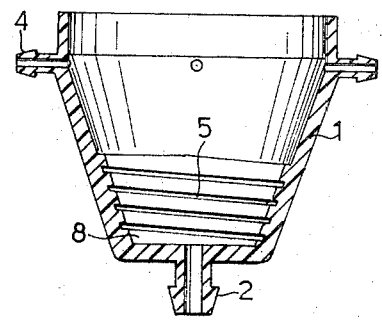
FIG. 3 is a sectional view of the housing used in the device of FIG. 1.
Figure 6:
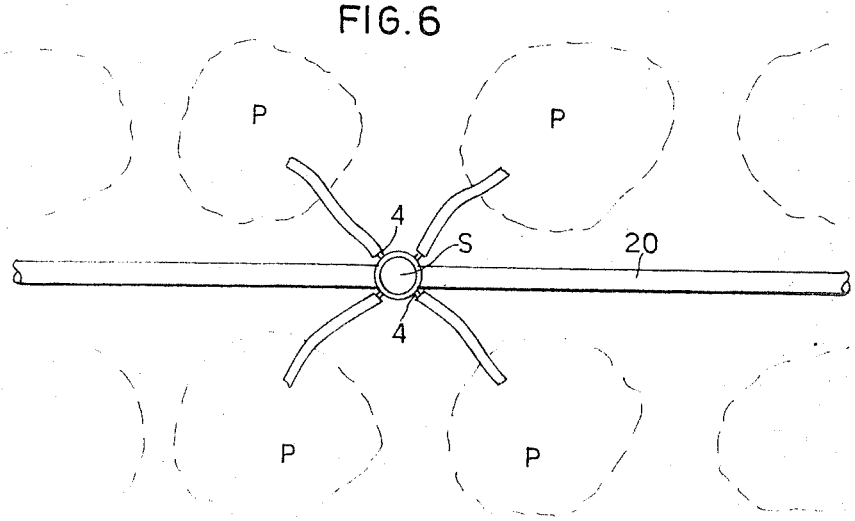
FIG. 6 illustrates the use of a device such as described above for irrigating a plurality of plants.

The trickle irrigation device illustrated in FIGS. 1–3 comprises a casing or housing 1 which is formed at its lower end with a connecting mouthpiece or tap 2 for insertion into an opening formed in the water supply pipe (e.g., 20 in FIG. 6). Two oppositely disposed arms 3, which extend from the lower end of housing 1, are adapted to clampingly embrace the water supply pipe with the tap 2 passing through the opening in the pipe. The trickle device illustrated includes four outlets 4 (only three being seen in FIG. 1) angularly displaced from each other by 90°. The water tapped from the water supply pipe 20 is discharged from all four outlets in a slow trickle. As can be seen in FIG. 3, the housing 1 is formed at its lower end with interior screw threads 5.

A core, generally designate 6 in FIG. 2, is disposed within the housing, the core having screw threads 7 at its lower end received within threads 5 of the housing. The two threads 5 and 7 are so dimensioned that between them they form a spirally extending conduit.

Above the screw threads 7, the core 6 (FIG. 2) is formed with a series of grooves 9 and ribs 10 which, when the core is threaded into the housing 2, define with the contacting surface of the housing a plurality of separate and distinct labyrinths 9a, 9b, etc. The outlet end of each labyrinth is in communication with one of the outlets 4 of the trickle device. The inlet end of each labyrinth is in communication with an annular plenum chamber defined by an annular recess 12 and the inner surface of the housing side wall.

When core 6 is inserted within housing 1, the bottom of the core is disposed slightly above the inner confronting surface of the housing, the space between these two members defining another chamber designated 8 in FIG. 3.

The operation of the device illustrated in FIGS. 1–3 is briefly as follows: When core 6 is threaded into housing 1, the above-mentioned chamber 8 (FIG. 3) communicates with tap 2 inserted into the water supply line 20 (FIG. 6). The water passing into the trickle nozzle through tap 2 thus first fills chamber 8 and then rises along the spirally extending conduit formed by housing threads 5 and core threads 7. The water rises to the level of the annular recess 12 and forms a second, annular pool in the chamber defined by that recess. Each of the separate labyrinths 9a, 9b etc., formed by the contacting surfaces of the core and housing, is fed from the annular pool of water within recess 12, and the water then proceeds through the four labyrinths separately and in parallel to the respective outlets 4, from each of which it discharges in the form of a trickle.

It will be appreciated that the one device illustrated is the functional equivalent of four trickle devices. If one of the labyrinths happens to become clogged, this will not affect the discharge of the water from the other labyrinth outlets. The device may be easily cleaned by merely removing core 6. Further, should different discharge rates be desired, it is only necessary to substitute a different core 6 designed for the appropriate discharge rate.

Figure 4:
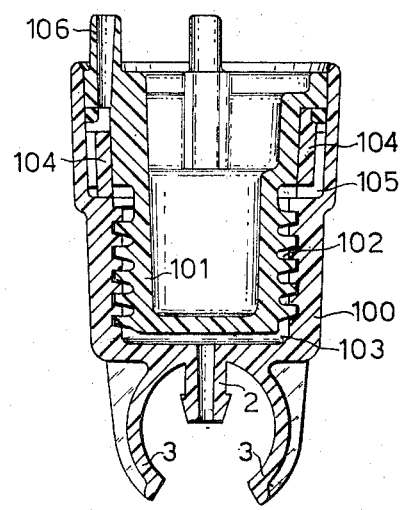
FIG. 4 is a sectional view, along lines IV—IV of FIG. 5 of another trickle irrigation device constructed in accordance with the invention.
Figure 5:
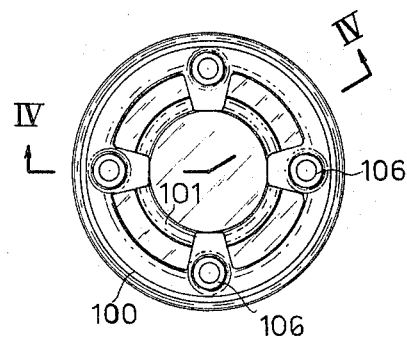
FIG. 5 is a top plan view of the device of FIG. 4.

FIGS. 4 and 5 illustrate another trickle irrigation device constructed in accordance with the invention. In device of FIGS. 4 and 5, both housing 100 and the core 101 are of cylindrical shape. In addition, instead of being a unitary member as in FIGS. 1–3, core 101 is made of two sections, namely a lower section 102 formed with the screw threads, and an upper annular insert section 104 formed with the labyrinth ribs and grooves. When the two-section core is disposed within the housing, a lower compartment 103 is formed (corresponding to compartment 8 in the previous embodiment) in which a pool of the water supplied from tap 2 collects. The water then ascends through the spirally-extending conduit formed by the threads to the annular chamber 105 leading to the four labyrinths, and finally exit from the outlet 106 of each labyrinth.

Since in this embodiment, the ribs and grooves defining the four labyrinths (with the inner surface of the housing 100) are carried by the annular insert 104 portion of the core, whenever the discharge rate is to be changed it is only necessary to replace the annular insert 104 with the appropriate one for the desired discharge rate.

Many other variations, modifications and applications of the illustrated embodiments will be apparent.

What is claimed is:

1. A trickle irrigation device, comprising a housing having a water supply inlet connectable to a water supply pipe, and an inner core disposed within the housing in contact with the inner surface thereof, characterized in that the inner surface of the housing and the outer surface of the core define a chamber communicating with the water supply inlet and further define a plurality of separate labyrinths each having its inlet end communicating with the chamber, the device further including separate water outlets each communicating with the outlet end of one of said labyrinths.

2. A device according to claim 1, wherein said housing is internally threaded at one end, and said core is externally threaded at one end, the two threads being so dimensioned that between them they form a spirally-extending conduit one end of which communicates with said water supply inlet, and the opposite end of which communicates with said chamber.

3. A device according to claim 2, wherein said housing and core are so dimensioned as to define a second chamber between said water supply inlet and said one end of the spirally-extending conduit.

4. A device according to claim 3, wherein said first mentioned chamber is defined by the inner surface of a side wall of the housing and an annular recess formed in the outer surface of the said core, and wherein said second chamber is defined by the bottom of the core and the inner surface of the bottom of the housing.

5. A device according to claim 1, wherein said core includes two separable sections, one section being attached to and within the housing, the other section being a removable annular insert carried by said one section and forming said labyrinths between it and the inner surface of the housing.

6. A device according to claim 1, wherein the contacting surfaces of the housing and core define four separate labyrinths leading from said chamber to four separate outlets.

7. A trickle irrigation device, comprising: a housing formed at one end with an inlet connectable to a water supply pipe, and with a plurality of separate water outlets at the opposite end; said one end of the housing being internally threaded; and a core formed at one end with external threads dimensioned with respect to the internal threads of the housing to define between them a spirally-extending conduit communicating with said inlet; the opposite end of said core being formed with a surface configuration which, together with the contacting inner surface of the housing, defines a chamber and a plurality of separate labyrinths each having one end communicating with said chamber and the opposite end communicating with one of said outlets.

8. A device according to claim 7, wherein said core includes a separate annular insert formed with external ribs defining said labyrinth, said annular insert being removably attached to the remainder of the core.

9. A trickle irrigation device, comprising: a housing having a water supply inlet connectable to a water supply line, and an inner core disposed within the housing in contact with the inner surface thereof; said core being formed within an annular recess in its outer surface forming, with the inner surface of the housing, an annular chamber; said core further defining, with the inner surface of the housing, a plurality of separate labyrinths each having an inlet in communication with said chamber and a separate outlet leading out of the trickle irrigation device.

10. A device according to claim 9, wherein said housing is internally threaded at one end, and said core is externally threaded at one end, the two threads being so dimensioned that between them they form a spirally-extending conduit one end of which communicates with said water supply inlet and the opposite end of which communicates with said chamber.

* * * * *